Nov. 8, 1938.  A. ENGEL  2,135,869
TIRE VALVE
Filed June 13, 1935

INVENTOR
Abraham Engel,
BY
Fraser, Myers & Manley
ATTORNEYS

Patented Nov. 8, 1938

2,135,869

UNITED STATES PATENT OFFICE 2,135,869

TIRE VALVE

Abraham Engel, Brooklyn, N. Y.

Application June 13, 1935, Serial No. 26,399

3 Claims. (Cl. 137—69)

The present invention relates to tire valves and aims to provide certain improvements therein. More particularly it relates to what are known as top repair tire valves wherein the tire valve inside mechanism is inserted into and removed from the tire valve stem through the opening in the top thereof. This application is a continuation in part of my copending application Serial No. 600,615, filed March 23, 1932, now Patent No. 2,068,266, granted January 19, 1937.

Tire valves in almost universal use at the present time are of the top repair type and comprise a valve stem and a valve insides that is insertable into and removable from the stem as a unit and are fitted with a valve cap which provides both a secondary seal for the valve insides and a means for excluding foreign matter from gaining entrance into the valve stem. The valve cap also gives a more finished appearance to the valve stem. The valve cap, however, must be removed every time one desires to inflate, deflate or gauge the pressure within a tire, and frequently the cap is not replaced or is mislaid, with the consequent result that its functions on the valve stem are not otherwise taken care of. Also, on those tires on truck and buses which overlie the brake-drum, the valve stems and valve caps become so hot as to require the use of gloves or pliers for their removal, which, of course, is not conducive to efficiency in operation or such as to encourage their replacement upon the valve stems after being removed.

In view of the foregoing objections it has been proposed to substitute for the conventional valve cap, what is commonly known as an inflating valve cap, that is, a cap member adapted to be screwed onto the valve stem and containing a self-closing check valve therein adapted to be unseated by the deflating pin of a pump coupling or the like, and, in turn, unseat the valve check within the valve stem. These inflating valve caps have met with various degrees of success but are costly and unnecessarily add to the length and weight of the tire valve stem.

According to my present invention I provide the conventional valve stem with means for excluding foreign matter from gaining access to the valve insides and for inflating, deflating and gauging the tire directly through said means without any physical removal or adjustment of parts and without materially adding to the effective length of the valve stem. Preferably, the means which I employ is in the form of a valve cap unit adapted to engage within the outer end of the valve stem, said valve cap having an opening in its top, a member within said casing normally providing a closure for said opening and when in open position permitting free passage of fluid through the casing, and a spring within the cap normally holding the closure member in its closing relation to said opening. The closure member and the spring are so mounted within the cap as to normally clear the projecting end of the valve pin within the valve stem when the cap is applied thereon. My invention also contemplates other features of novelty which will be understood from the detailed description which follows.

In the accompanying drawing which shows two embodiments of my invention—

Figure 1 is a fractional elevation of the top of a tire valve stem with parts thereof broken away to show the features of my invention.

Figs. 2 and 3 are sections taken substantially along the planes of the lines 2—2 and 3—3, respectively, of Fig. 1, the spring being omitted from Fig. 3.

Figure 1:
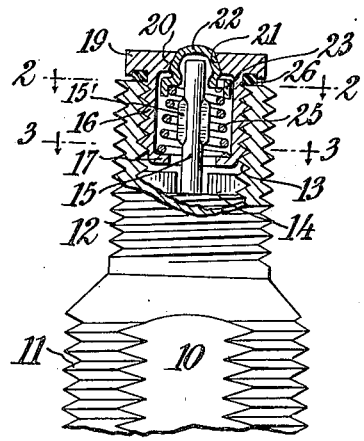
Figure 2:
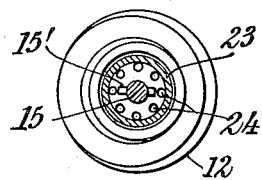
Figure 3:
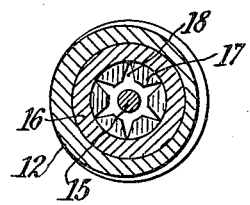

Referring first to Figs. 1 to 3 of the drawing, let the numeral 10 indicate a conventional tire valve stem which is externally screw-threaded as indicated at 11 and formed with a reduced externally-threaded nipple portion 12. The stem is formed with an axial bore extending longitudinally therethrough, which bore, at its nipple end, is internally screw-threaded as indicated at 13 and is fitted with a conventional valve insides consisting of an externally screw-threaded plug 14, the top of which is only shown, and a valve pin 15 upon which a valve check (not shown) is mounted and which is normally held against the valve seat by a valve spring (not shown). The valve pin 15 extends to approximately the outer end of the valve stem, and as is conventional in most tire valve stems, said valve pin projects slightly beyond the top of said valve stem.

According to my present invention the conventional valve cap is dispensed with and as a substitute therefor I provide a construction which not only has the characteristics and functions of a valve cap but also permits inflation, deflation and gauging of the tire directly therethrough. As shown, said valve cap consists of an externally screw-threaded bushing or casing 16 formed at its inner end with an inwardly directed lip or flange 17 provided with radial openings or recesses 18 and at its outer end with both an outwardly directed flange 19 adapted for finger engagement and an inwardly directed flange 20 provided with a tapered or conical valve seating face 21. Adapted to engage against said seating face and provide a leaktight seal therewith is a valve member 22 formed of suitable material, said valve having an outer conical or spherical surface and provided at its under side with an outwardly and downwardly directed annular flange 23 adapted for sliding engagement with the inner wall of the casing 16 for guiding the valve in its movements to and from its seat. The flange 23 is provided with openings 24 to promote the passage of fluid past it when the valve is unseated. To normally hold the valve against its seat there is provided a coil spring 25 which bears at one end against the flange 23 and at its other end seats on or is supported by the flange 17. To provide a seal against leakage of air through the cap which might find its way past the tire valve proper, I provide a packing washer 26 on the under side of the flange 19 for engagement with the top of the valve stem. It will be apparent that the inner diameters of the flange 17 and the spring 25 are such as to permit free movement therein of the valve pin 15 and the enlargement 15' thereon. In other words, the internal diameters of the flange 17, the valve 22 and the spring 25 are such as to clear the projecting end of the valve pin 15 when the cap is applied to the valve stem. It will be further apparent that the flange 19, together with the packing washer 26, has a combined thickness of the valve stem at the nipple end thereof and consequently only adds said amount to the effective length of the valve stem when the cap is applied thereto. Furthermore, the maximum diameter of the flange 19 is such as not to interfere with the application of a conventional tire inflating coupling to the tire valve nipple 12.

Figure 5:
Fig. 5 is a section taken substantially along the plane of the line 5—5 of Fig. 4.
Figure 4:
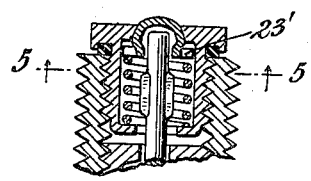
Fig. 4 is a fractional longitudinal section through the top of a tire valve stem showing a modified form of my invention.

In Figs. 4 and 5 I have shown the flange on the valve member in the form of a spider having arms 23' so as to provide larger openings for the passage of fluid therethrough when the valve is unseated. The lip 17 at the lower end of the casing in Fig. 4 may also be in the form of a spider to promote the passage of fluid therethrough.

The valve cap as described, it will be apparent, is a self-contained unit and may be readily applied to any conventional valve stem and when so applied will not materially add to the length and weight of the stem, will provide the customary seal at the outer end of the valve stem, will give a finished appearance to the valve stem and will in view of its small overall diameter also permit inflating, deflating and gauging of the tire therethrough by conventional appliances. This will be apparent for upon depressing the valve 22 it will engage and depress the valve pin 15 to unseat the valve check (not shown) within the valve stem to provide free ingress and egress of fluid through the stem and the cap. This passage of fluid is further facilitated by the openings in the flanges 17 and 23.

While I have shown and described two preferred embodiments of my invention, it is to be understood that I do not wish to be limited to the details of construction disclosed, since it will be apparent to one skilled in the art that the same may be modified without departing from the spirit of my invention.

What I claim is:

1. A tire valve or the like comprising a casing with a valve insides therein having a valve pin extending to approximately the top of the casing, and a valve cap engaging the outer end of the casing and extending beyond the top of said casing to an amount of the order of the thickness of the casing at the nipple end thereof, said valve cap having a top wall with an opening therein, a member adapted to provide a closure for said opening and a spring encircling the valve pin of the valve insides and normally holding said closure member in its closing position within the cap, said spring being independent of and supplemental to any valve insides closing spring, said closure member being adapted upon being depressed to depress the valve pin to unseat the valve check of the valve insides.

2. A tire valve or the like comprising a casing with a valve insides therein having a valve pin extending to approximately the top of the casing, and a valve cap engaging the outer end of the casing and extending beyond the top of said casing to an amount of the order of the thickness of the casing at the nipple end thereof, said valve top having its side wall engaging within the casing, said valve cap having a top wall with an opening therein, a member adapted to provide a closure for said opening and a spring carried by the cap encircling the valve pin of the valve insides and normally holding said closure member in its closing position within the cap, said closure member being adapted upon being depressed to depress the valve pin to unseat the valve check of the valve insides.

3. A tire valve or the like comprising a casing with a valve insides therein having a valve pin extending to approximately the top of the casing, and a valve cap engaging the outer end of the casing and extending beyond the top of said casing to an amount of the order of the thickness of the casing at the nipple end thereof, said valve cap having a top wall with a valve seat opening therein, a valve member adapted to provide a closure for said opening and a spring encircling the valve pin of the valve insides and normally holding said valve member in valve seating position within the cap, said spring being independent of and supplemental to any valve insides closing spring, said valve member being adapted upon being depressed, to depress the valve pin to unseat the valve check of the valve insides.

ABRAHAM ENGEL.